G. MAROSI 3,373,374

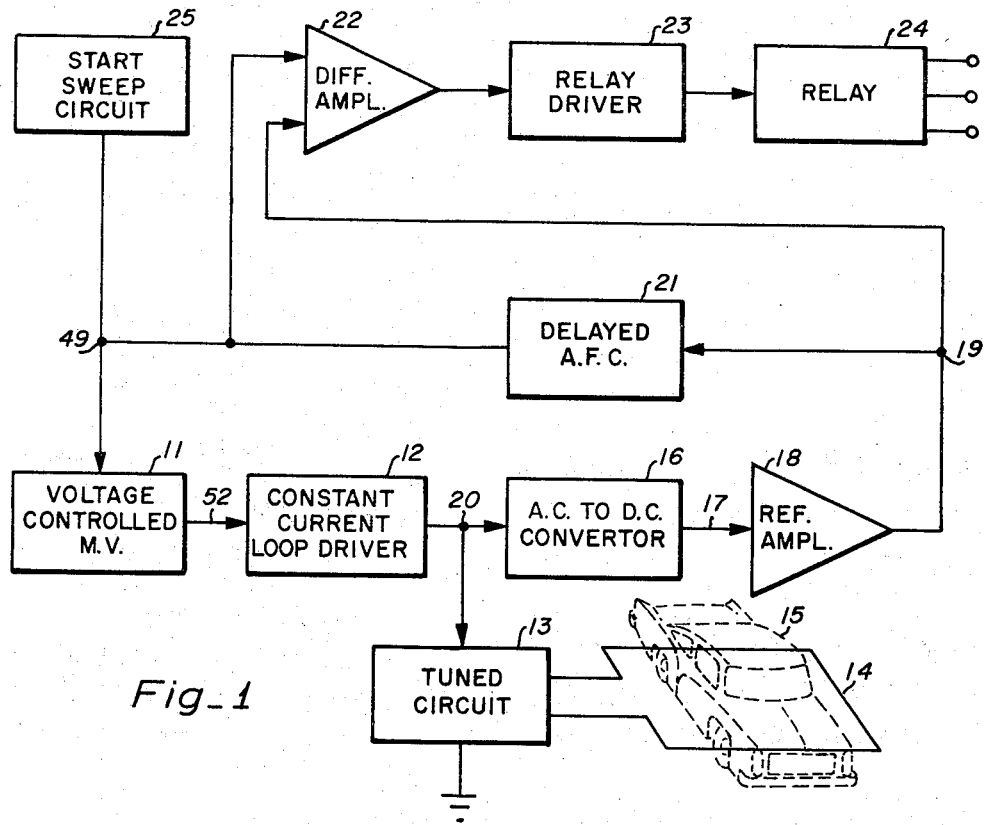
Fig_1
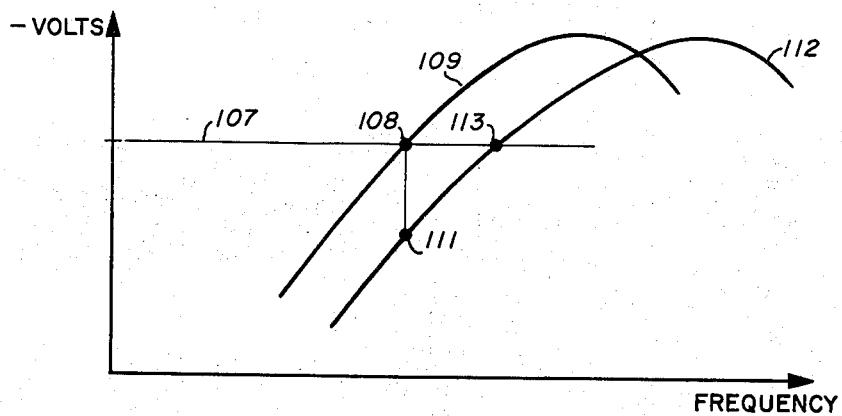
Fig_2
INVENTOR.
GILBERT MAROSI
BY Edward A. Robinson
ATTORNEY March 12, 1968

SELF-TUNABLE VEHICLE PRESENCE DETECTOR SYSTEM

Filed June 1, 1966

United States Patent Office 3,373,374
Patented Mar. 12, 1968

3,373,374
SELF-TUNABLE VEHICLE PRESENCE DETECTOR SYSTEM
Gilbert Marosi, Sunnyvale, Calif., assignor to General Precision Systems Inc., a corporation of Delaware
Filed June 1, 1966, Ser. No. 554,442
9 Claims. (Cl. 331—8)

ABSTRACT OF THE DISCLOSURE

In this vehicle presence detector system, a constant current oscillatory signal is passed to a tuned circuit including an inductive loop. A vehicle moving over the loop will vary the inductance and the loading thereof to vary the voltage amplitude of the signal which is rectified and amplified, and is passed to an automatic frequency control circuit, AFC. The AFC voltage controls the frequency of a multivibrator which generates the oscillatory signal. During an initial transient period after the system is turned on, a transistor-capacitor "start sweep" circuit pre-empts the AFC to prevent the multivibrator from "running away" at a high frequency. The AFC or the "start sweep" control voltage is applied to bias two transistors for controlling the discharge rate of capacitors and thereby controlling the oscillatory frequency of the multivibrator. A further transistor may be selectively coupled into the multivibrator circuit for permitting operation at different power supply voltages.

---

This invention relates to vehicle presence detector systems wherein a vehicle moving over an inductive loop embedded in the paving of a traffic lane of a street or highway will vary the inductive characteristics and other parameters of the loop which are sensed to provide an output signal indicative of the presence of the vehicle.

Inductive-loop vehicle detectors have been disclosed in a Patent No. 3,164,802, granted to Robert A. Kleist and John Scarbrough on Jan. 5, 1965. Another inductive-loop vehicle detection system is shown in Patent No. 2,917,732, granted to W. P. Chase et al., on Dec. 15, 1959. These patents disclose systems wherein the inductive loop is electrically connected into a resonant, or tank, circuit of the oscillator to vary the frequency of oscillation when a vehicle moves over the loop. A co-pending patent application, filed by Robert Bruce Switzer on Nov. 29, 1965, Ser. No. 510,338, entitled, "Inductive Loop Vehicle Detector," assigned to the same assignee as the instant patent application, discloses a vehicle presence detector system wherein the inductive loop is electrically connected as a part of a resonant circuit coupled to load an oscillator. Variation in the oscillator loading, due to vehicles moving over the loop, causes corresponding variations in the amplitude of the signal appearing across the loop, and the variations in signal amplitude are sensed to provide an output indication of a vehicle presence.

It is an object of this invention to provide an improved vehicle presence detector system employing a multivibrator, or relaxation type oscillator, and, in particular, it is an object to provide an astable multivibrator circuit for generating an oscillatory signal having a frequency which is determined by a control voltage impressed upon the oscillator through an automatic frequency control, AFC, feedback loop.

A further object of this invention is to provide an improved vehicle presence detector system wherein an inductive loop is electrically coupled as a part of a resonant circuit which receives power from a constant-current source driven by an astable multivibrator, and wherein the signal amplitude appearing across the loop and across the resonant circuit is compared to a predetermined potential level for establishing an AFC voltage which is fed back to control the frequency of the multivibrator.

Another object of this invention is to provide an improved vehicle presence detector system employing a multivibrator controlled by an AFC signal level in normal operation, and further providing a start-sweep circuit for passing a bias potential to pre-empt the AFC voltage and to control the frequency of the multivibrator during an initial transient period when power is first applied to the system, whereby the multivibrator is initially caused to oscillate at a substantially less than normal operating frequency and is permitted to gradually increase in frequency of oscillation until the AFC voltage assumes control of the system.

A further object of this invention is to provide an improved voltage-controlled, astable multivibrator circuit for a vehicle presence detectory system and, more particularly, it is an object to provide a multivibrator circuit that is "non-stalling," in that a proper bias is applied to each of two complementary transistors, regardless of the conductive state of either transistor.

Numerous other objects and advantages of this invention will be apparent throughout the progress of the specification which follows. The accompanying drawings illustrate a certain exemplary embodiment of this invention, and the views thereof are as follows:

FIGURE 1 is a system diagram of the vehicle presence detector of this invention wherein the various component circuits are shown as blocks;

FIGURE 2 is a graphic representation of a signal frequency characteristic of the AFC level and multivibrator frequency.

Figure 3:
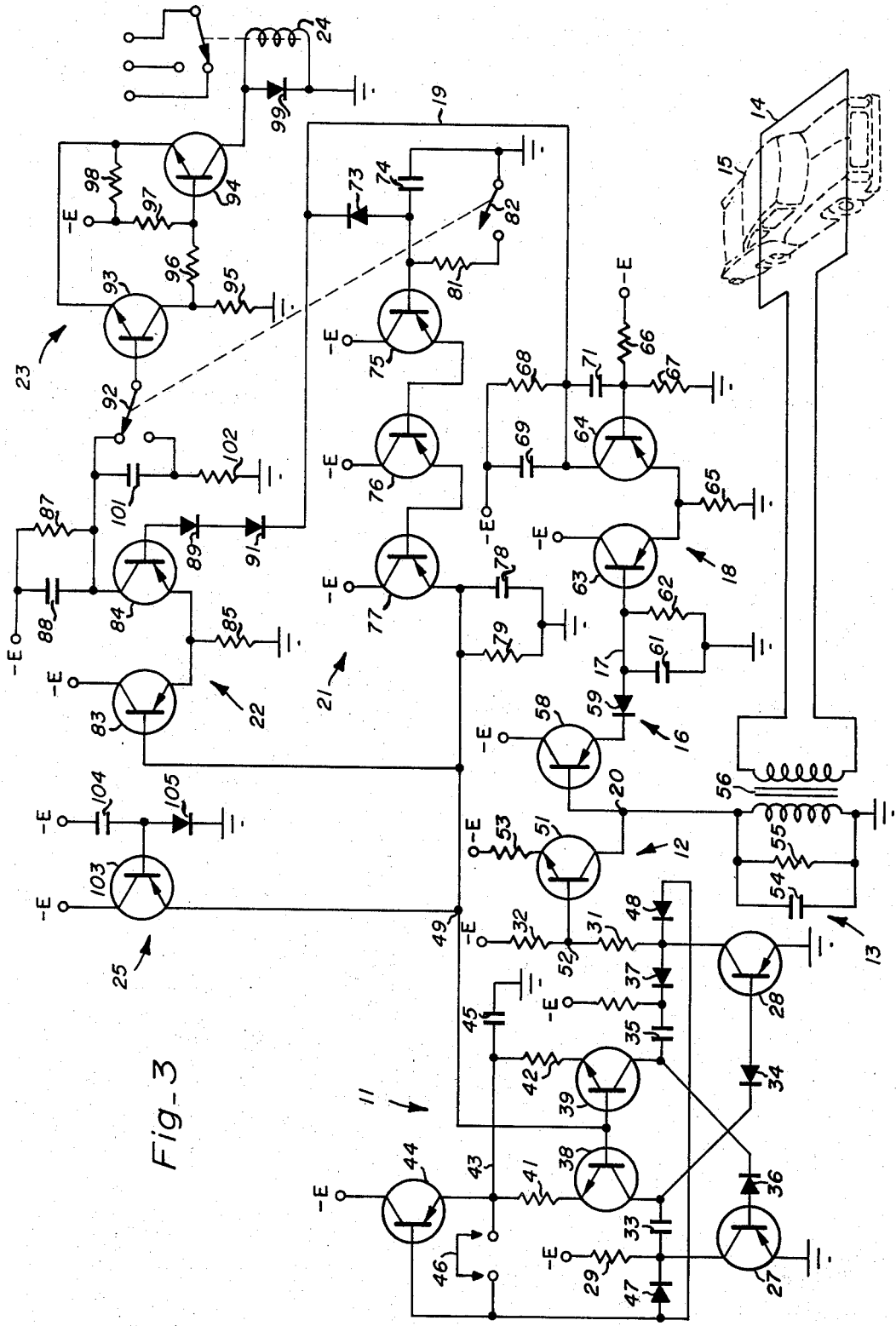
FIGURE 3 is a detailed diagram of the vehicle presence detector system, showing the complete circuit thereof.

Briefly stated, according to a preferred embodiment of this invention, the presence detector system comprises an astable, or free-running, multivibrator 11 for generating an oscillatory signal. A constant-current loop-driving circuit 12, coupled to the multivibrator 11, passes a constant-current pulsed signal to a tuned circuit 13, which includes an inductive loop 14. The oscillatory signal appearing at a point 20 applied to the tuned circuit 13 will be a sine wave whose amplitude will be determined by the parameters of the tuned circuit and of the inductive loop 14. When a vehicle 15 moves over the inductive loop, additional power is consumed and a decrease in signal amplitude appears at the point 20. An alternating-current to direct-current converter or rectifier 16 will generate a direct potential level on a lead 17 corresponding with the amplitude of the signal at the point 20. A reference amplifier 18 compares the direct potential level of the lead 17 with a standard voltage to generate an amplified direct potential level on a lead 19 corresponding to the amplitude of the oscillatory signal applied to the tuned circuit 13. A delayed automatic frequency control, AFC, circuit 21 passes the signal level of the point 19 to the oscillator for controlling the frequency thereof. When a vehicle 15 moves over the loop 14, a voltage variation appears at the point 19, and this variation is sensed by a differential amplifier 22 controlling a relay driver circuit 23 and an output relay 24, to provide an output indication of the presence of the vehicle 15. When power is initially applied to this system, a start-sweep circuit 25 pre-empts the AFC circuit 21 and provides an initial control of the multivibrator 11 such that the oscillatory signal will initially be of a frequency less than a normal frequency. The start-sweep circuit 25 operates through a time constant circuit, and becomes less effective as time passes, and, eventually, the start-sweep circuit 25 loses control of the multivibrator 11, and the control thereof is assumed by the AFC circuit 21.

The multivibrator 11 comprises a pair of transistors 27 and 28 which are cross-coupled between the respective base electrodes and collector electrodes. The emitter electrodes of the transistors 27 and 28 are directly connected to the ground reference potential. The collector electrode of the transistor 27 is coupled to a negative voltage source −E by a load resistor 29, and the collector electrode of the transistor 28 is coupled to the negative voltage source −E by resistors 31 and 32. The base of transistor 28 is coupled to the collector electrode of the transistor 27 by a charging capacitor 33 and a diode 34. The base electrode of the transistor 27 is coupled to the collector electrode of the transistor 28 by a charging capacitor 35, a diode 36, and a further diode 37, which functions to decouple the load of the constant-current loop drive 12 from the base electrode of the transistor 27. A second pair of transistors 38 and 39 constitute constant-current sources for supplying the discharging currents to the charging capacitors 33 and 35. Thus, the transistors 38 and 39, together with load resistors 41 and 42, couple the base electrodes of the transistor 28 and 27 to a negative potential, which will appear on the lead 43.

The transistors 38 and 39 provide a "non-stalling" feature for the multivibrator 11. Ordinarily, the cross-coupled transistors of a multivibrator furnish base-collector biasing for each other such that one transistor in conduction causes the other transistor to be nonconductive and vice versa. However, when the circuit is initially turned on and power is first applied thereto, a condition may exist in which neither transistor is conductive, and no bias is transferred from one transistor to another for driving the other transistor into conduction. If this condition occurs, the multivibrator circuit is said to be "stalled." In the multivibrator of this invention, the transistors 38 and 39 will pass biasing currents to the base electrodes of the transistors 28 and 27 respectively to force one or the other of the transistors 27 and 28 into conduction to break the "stall," and to initiate a normal cyclic operation of the multivibrator circuit.

When this multivibrator 11 is operated from a battery source voltage, wherein −E is a negative 12 volts with reference to ground, a transistor 44 will continue to provide a negative biasing level on the lead 43. A capacitor 45, coupled between the lead 43 and the ground reference potential, stores the negative voltage level. In the event that it is desired to operate the multivibrator 11 from a 20-volt source rather than from the 12-volt supply, a jumper connection 46 is closed between the emitter and base electrodes of the transistor 44, thereby rendering the transistor nonconductive. In this mode of operation, a pair of diodes 47 and 48 rectify the square waves generated by the transistors 27 and 28, and the rectified waves are stored in the capacitor 45 to provide the necessary negative reference voltage on the lead 43. With the jumper connection 46 removed, the transistor 44 provides current amplification of the rectified voltage from the diodes 47 and 48 such that the collector electrodes of the transistors 27 and 28 will not be unduly loaded by the currents drawn by transistors 38 and 39. The current amplification by the transistor 44 has been found to be desirable to avoid loading and degrading the operation of the transistors 27 and 28 when the system is operated at a reduced voltage supplied by a storage battery. In particular, the performance of the multivibrator circuit at higher frequencies is noticeably improved by the transistor 44. On the other hand, the jumper connection is made to intentionally degrade the multivibrator operation when the system is operated from a normal 20-volt power supply. With a normal power supply voltage, it is desirable to reduce the range of frequency variation of the multivibrator in response to an increased AFC voltage variation, and this is accomplished through the jumper connection 46.

As in other multivibrator circuits, the duration of each half-cycle is determined by a decay of the charge from the capacitors 33 and 35. In this multivibrator circuit, the capacitors are discharged by current which is passed by the respective transistors 38 and 39. The conduction rate of the transistors 38 and 39 is controlled by a negative biasing potential applied to the base electrodes thereof from the AFC lead 49. Since the rate of discharge of the capacitors 33 and 35 determines the respective periods of the half-waves and thereby determines the frequency of the multivibrator 11, it follows that the bias appearing on the lead 49 controls the frequency of the oscillatory signals from the multivibrator 11.

The constant-current loop driver 12 comprises a transistor 51 having a base electrode coupled to a lead 52 at the output of the multivibrator 11. The emitter electrode of the transistor 51 is coupled to the negative voltage −E by a resistor 53. The collector electrode of the transistor 51 is directly connected to the point 20 for passing pulsed signals of constant current and is coupled to ground through the tuned circuit 13. The transistor 51 is conductive during alternate half-cycles of the oscillatory waves and will be nonconductive during the other half-cycles. Although the oscillatory wave appearing at the point 52 will be a typical square wave of a multivibrator output, the wave appearing at the point 14 has been observed to be substantially sinusoidal due to the ringing effect of the tuned circuit 13. The resonant circuit 13 comprises a capacitor 54 and the inductive loop 14, together with a resistor 55. The loop 14 is coupled to the capacitor 54 by a transformer 56. The resonant circuit 13 may be grounded, while the loop 14, being transformer-coupled, is permitted to be ungrounded, or floating. The resonant circuit 13 is coupled as a load to the constant-current source 12, and, normally, with no vehicle near the loop 14, the loading of the circuit 12 by the resonant circuit 13 will be substantially constant in value. The resistor 55 will contribute to the loading, and the losses of the loop 14 and a lead-in cable between the loop 14 and the transformer 56 will likewise contribute to the normal value of load. A vehicle 15 moving over the loop 14 decreases the load impedance, since the vehicle, being inductively coupled to the loop 14, constitutes a shorted turn for dissipating energy from the loop. Furthermore, the inductive value of the loop 14 will be decreased by the preence of a vehicle 15 such that the resonant frequency of this circuit 13 will be increased. The over-all effect of a vehicle is therefore to decrease the amplitude of the oscillatory signal appearing at the point 20.

The rectifier circuit 16 comprises a transistor 58 and a diode 59 coupled thereto. The base electrode of the transistor 58 is directly connected to the constant-current driver 12 and to the tuned-circuit load 13. The collector electrode of the transistor 58 is directly connected to the negative voltage source −E. A capacitor 61 is coupled to receive and store charge from the transistor 58 via the diode 59 and to thereby establish a direct potential on the lead 17 corresponding to the amplitude of the oscillatory signal appearing at the point 14. A resistor 62 is coupled across the capacitor 61 to provide a discharge path therefor. The value of the resistor 62 is so chosen that the capacitor 61 will be discharged with a time constant of greater duration than the period of the oscillatory signal, whereby the voltage level of the lead 17 may decay rapidly to correspond with the amplitude of the oscillatory signal.

The reference amplifier 18 comprises a pair of transistors 63 and 64 having the emitter electrodes both coupled to the ground reference by a common resistor 65. The base electrode of the transistor 63 is directly connected to the direct potential of the lead 17, and the base electrode of the transistor 64 is connected to a potential determined by a pair of voltage-dividing resistors 66 and 67 which are coupled between the negative voltage source —E and ground. The collector electrode of the transistor 63 is directly connected to the negative voltage source —E, and the collector electrode of the transistor 64 is coupled to the negative voltage source by a resistor 68, which is bypassed by a capacitor 69. Another capacitor 71 is coupled between the base electrode and the collector electrode of the transistor 64. The capacitors 69 and 71 constitute low pass filters for blocking the operating oscillatory signal while passing direct-current potential levels. The amplifier 18 is coupled as a differential amplifier for comparing the negative signal level of the lead 17 with a predetermined signal level established by the potential dividing resistors 66 and 67. If the voltage of the lead 17 is more negative than the voltage established by the resistors 66–67, the transistor 63 will become more conductive than the transistor 64, whereby the signal level appearing on the lead 19 will approach the value of the negative voltage source —E. On the other hand, when the voltage level of the lead 17 is less negative than the voltage level established by the resistor 66–67, the transistor 64 will become more conductive, and the signal level appearing on the lead 19 will become less negative.

The signal level of the lead 19 is passed by the AFC circuit 21, which includes a diode 73, a capacitor 74, and three transistors 75, 76, and 77, connected together as a Darlington amplifier. The negative voltage level of the lead 19 will be passed by the diode 73 and will be stored in the capacitor 74. As the voltage level of the lead 19 varies to become more negative, the variation will be passed by the diode 73 and will immediately appear across the capacitor 74. However, if the voltage level of the lead 19 becomes less negative, the diode 23 will become nonconductive and will isolate the capacitor 74 such that the voltage impressed upon the base electrode of the transistor 75 will be held substantially constant by the capacitor 74. The Darlington amplifier, 75, 76, 77, presents a high impedance to the capacitor 74. The AFC voltage passed by the Darlington amplifier is filtered by a further capacitor 78, and is applied, via the lead 49, to control the frequency of the oscillatory signal generated by the multivibrator 11. A resistor 79 ensures that transistors 75, 76, and 77 will remain conductive when transistors 38 and 39 are drawing maximum base current.

If it is desired to operate this system in a pulse mode rather than a full presence mode of vehicle detection, a resistor 81 may be coupled across the capacitor 74 by the closure of a switch 82. In this event, a relatively short time constant discharge path is provided for the capacitor 74. The switch 82 is provided such that the vehicle presence detector system of this invention will furnish pulses for counting vehicles which may pass over the loop 14. Since a short-duration output pulse may be generated corresponding to each vehicle, the presence detector system may be used in conjunction with a counter for merely counting the number of vehicles which pass along a traffic lane rather than for providing a full presence output signal wherein the output relay 24 is held in a switched position for the duration of the time that a vehicle occupies the space over the loop 14.

The differential amplifier 22 includes a pair of transistors 83 and 84 having emitters coupled to the ground reference potential by a common resistor 85. The base electrode of the transistor 83 is directly connected to the point 49 for receiving the AFC voltage level, and the base electrode of the transistor 84 is coupled to the lead 19 for receiving the direct signal level from the reference amplifier 18. When the signal level of the lead 19 changes to become less negative than normal, the diode 73 becomes nonconductive, and the AFC voltage of the lead 49 is determined by the charge stored by the capacitor 74. During this time, the differential amplifier will sense the difference in levels between leads 19 and 49 and will pass a signal to the relay driver circuit 23. A load resistor 87, bypassed by a capacitor 88, is coupled between the collector electrode of the transistor 84 and the negative voltage source —E. Thus, when the lead 19 becomes more positive than the lead 49, the transistor 83 becomes conductive, and the transistor 84 tends to become nonconductive to provide an output signal for the relay driver 23. A pair of diodes 89 and 91 are connected in series between the base electrode of the transistor 84 and the lead 19, to make the voltage applied to the base electrode of transistor 84 at least 1.4 volts more positive than without them. This enables the differential amplifier 22 to change conducting states with a voltage swing on lead 19 of 1.4 volts (two diode drops) less than if the two diodes were not used. The over-all effect of the diodes 89 and 91 is to increase the sensitivity of the unit to vehicle presence.

The relay driver circuit 23 may be coupled to the differential amplifier 22 by a switch 92. The relay driver 23 includes a pair of transistors 93 and 94, which normally function as a Schmidt trigger. The collector electrode of the transistor 93 is coupled to the ground reference potential by a resistor 95 and is coupled to the base electrode of the transistor 94 by a resistor 96. The base electrode of the transistor 94 is coupled to the negative voltage source by a resistor 97. Both emitter electrodes of the transistors 93 and 94 are coupled to the negative voltage source by a common resistor 98. Normally, the transistor 93 is conductive, while the transistor 94 is nonconductive such that no current will pass through the winding of the relay 24. However, during the intervals when a vehicle's presence is sensed, the transistor 93 will become nonconductive, while the transistor 94 becomes conductive, thereby energizing the relay 24 and causing switching action of the output terminals thereof. A diode 99 is coupled across the winding of the relay 24 to provide a conductive path for transient currents when the transistor 94 changes state from conduction to nonconduction.

As indicated heretofore, the relay-driver circuit 23 is normally connected as a Schmidt trigger by a switch 92. However, when it is desired to operate the vehicle presence detector system in a pulse mode for counting applications or the like, the switch 92 is thrown to alternate position such that the base electrode of the transistor 93 is coupled to an RC circuit including a capacitor 101 and a resistor 102. The RC circuit 101–102 provides a time constant operation for the Schmidt trigger, thereby changing the circuit 23 from a bi-stable operation to a monostable operation, with the switch 92 in the alternative position. The relay driver 23 provides a pulse output for operation of the output relay for a duration of time corresponding to the pre-set pulse determined by the time constant of the RC circuit. As indicated in FIGURE 3, the switches 82 and 92 are ganged together for simultaneous operation such that the vehicle presence detector system may operate in a full presence mode or in a pulse mode.

The start-sweep circuit 25 comprises a transistor 103 and a capacitor 104. A diode couples one terminal of the capacitor 104 to the ground reference potential. During times when no power is applied to this system, the voltage source —E becomes equal to ground reference potential, and therefore the capacitor 104 is discharged through a diode 105. When the system is initially energized upon installation or following a shutdown or power failure, the capacitor 104 is in a state of discharge. Therefore, during the transient interval when the power is initially applied, the negative voltage source —E is applied through the capacitor 104 to the base electrode of the transistor 103. The transistor 103 is rendered conductive such that the negative voltage source —E is passed via lead 49 to control the frequency of the multivibrator 11. During this interval, the start-sweep circuit 25 preempts control of the multivibrator from the AFC circuit 21. The initial voltage applied via the lead 49 to control the multivibrator 11 is substantially equal to the —E reference potential, and therefore the multivibrator will commence oscillation at minimum frequency. With the passage of time, the capacitor 104 will accumulate charge such that the base electrode of the transistor 103 will become less negative, to eventually render the transistor nonconductive. The time constant involved depends upon the value of the capacitor 104 and resistive value of the element 79 multiplied by the beta, or amplification factor, of the transistor 103. When the transistor 103 becomes nonconductive, the start-sweep circuit 25 becomes ineffective in controlling the multivibrator 11, and the AFC circuit 21 becomes more effective and eventually assumes control of the multivibrator frequency. Vehicle presence detector systems built in accordance with this invention have been operated, and it has been observed that an initial time interval of 10 seconds to 30 seconds is required for the start-sweep circuit 25 to transfer control to the AFC circuit 21. The transition from the start-sweep control to the AFC has been observed to be smooth and gradual, whereby the multivibrator frequency commences at 10 kilocycles and slowly increases to an ultimate operating frequency in the range of 30 kilocycles to 100 kilocycles.

As indicated by FIGURE 2, the filtered output voltage of the tuned circuit 13 is established at a level such as shown by the horizontal line 107, which has been observed to be negative 3 volts. Normally, with no vehicle over the loop 14, the unit will stabilize at an operating point 108. With no vehicle present over the loop, a response curve 109 is indicative of the characteristic of the oscillator frequency and the voltage appearing on the lead 17. The curve 109 presents a rather linear positive slope in an operating region near the point 108. If the frequency of oscillation increases, the voltage will become more negative and, when applied as an AFC voltage, will cause the multivibrator to decrease in frequency. Therefore, the system operation is stable about the point 108 on the curve 109.

However, if, for any reason, the frequency were increased to such a value that the operating point passed the maximum of the curve 109 and moved to the negative slope thereof, the operation of the system would become unstable, and the frequency of the multivibrator 11 would continue to increase, whereby the AFC circuit would lose control of the system. Under normal conditions of operation, there are no factors which would cause the frequency of the multivibrator to increase beyond the range of stability, except during a transient period when power is initially applied to the system. When power is initially applied to the system, there is no negative AFC voltage to limit the frequency of the multivibrator, and therefore it is necessary that an initial negative control voltage be supplied by the start-sweep circuit 25. The initial operation of the start-sweep circuit 25 ensures that the multivibrator will start at a low frequency when power is initially applied to the system. Thus, the multivibrator starts at a low frequency, which is permitted to increase gradually toward the normal operating point as the start-sweep circuit 25 becomes less effective, and the AFC circuit 21 is enabled to assume control of the system.

When there is no vehicle 15 over the loop 14, the presence detector system may assume a stable operating point 108 upon the curve 109. The AFC voltage at this time is determined by the control voltage applied to the multivibrator 11 which causes the filtered direct-current voltage output of the tuned circuit to equal the reference voltage. If a vehicle moves over the loop, the power consumption and resonant frequency of the tuned circuit shifts, and the negative voltage level of the lead 17 will decrease to a point 111. The decrease of voltage at point 17 will cause the transistor 63 to cut off and the transistor 64 to turn on. The voltage of lead 19 therefore becomes less negative, cutting off diode 73, isolating capacitor 74, which continues to maintain AFC voltage and multivibrator frequency to its previous value. Although the negative voltage of the lead 17 will decrease, the AFC voltage will remain initially constant, since the diode 73 will cut off to isolate the capacitor 74, which maintains the AFC voltage. Obviously, if the vehicle 15 were to immediately depart from the loop 14, the negative voltage level would return from the point 111 to the normal operating point 108. If we assume that the vehicle remains over the loop for a substantial period of time (of the order of 20 minutes), the capacitor 74 will gradually lose its charge by leakage through the Darlington amplifier 75–77 and the resistor 79. As the capacitor 74 loses charge, the operating point of the system will move from the point 111, along a curve 112, to a new operating point 113 such that the initial voltage will be restored on the lead 17 and the system will again be normally operative, even though a vehicle is over the loop. The new AFC voltage will be determined by the control voltage on the multivibrator necessary to increase the frequency such as to make the filtered output voltage of the modified tuned circuit equal to the reference voltage established on the other side of the reference amplifier 18. Assuming the loop 14 is of sufficient size (covering two or more lanes of traffic), a second vehicle will cause relay operations even though the first vehicle remains indefinitely over the loop. In this case, the vehicle presence detector system is operating along a curve displaced to the right (as shown in FIGURE 2) of curve 112 rather than curve 109. If we assume that the vehicle 15 has been stationary over the loop 14 for more than 20 minutes, and that the system has stabilized on the curve 112; a sudden departure of the vehicle 15 from the loop will tend to cause the lead 19 to become more negative. In this case, the diode 73 will be conductive, causing an immediate change in the AFC level, which will cause an immediate shift in the frequency of the multivibrator 11 to return the system to the curve 109. Thus, it will be understood that when a vehicle enters the loop with the switch 82–92 in position, as shown, the system will "see" the vehicle for approximately 20 minutes, during which time the relay 24 will be energized. If the vehicle remains indefinitely, the system will eventually stabilize, and the relay 24 will drop out. The system will continue to function and to "see" additional vehicles which may pass over the loop 14 during this state of operation. However, should the vehicle 15 suddenly depart from the loop, the system will immediately stabilize upon the original curve 108 without delay. Therefore, it may be appreciated that the delayed AFC circuit provides a delay of one polarity only, permitting the system to "see" a vehicle for an extended period of time.

In the event that power is applied to the system at a time when there is a vehicle over the loop, the system will first stabilize on the curve 112 (following the initial transient period), but having thus stabilized on the curve 112, the system becomes immediately operable on the curve 109, when the vehicle departs from the loop. Therefore, it must be appreciated that the vehicle presence detector system is self-tunable. When a manufactured unit is placed in service, with lead-in leads from the loop 14 properly connected to the transformer 56, power may be applied to the system, which will promptly tune itself and become operable without any manual adjustments whatsoever. The particular frequency and AFC characteristic curve of operation is determined by the parameters of the loop and lead-in (together with the capacitance value of the element 54, which is built into the unit). A vehicle presence detector installation is usually accomplished by laying the inductive loop in the paving of a street or other traffic lane, and then subsequently connecting this loop to a manufactured unit, which comprises the remainder of the circuitry of FIGURES 1 and 3. The frequency of operation is not known at the time of manufacture. Since all field installations of inductive loops are unique, each installation will have different circuit parameters, including the loop inductive value, the resistance and capacitance of the lead-in, the leakage resistance, and stray capacitance to ground, and further losses which may be attributed to inductive coupling between the loop and nearby structural elements or concrete reinforcing materials. The system frequency is determined by many factors which are unknown, and, therefore, the frequency will be unknown prior to installation. However, the system frequency is of no consequence, since the system will stabilize and find a point of normal operation which may be as low as 30 kilocycles, or may be as high as 100 kilocycles. The multivibrator circuit 11 of this invention has proven to be capable of generating signals over this band of frequencies, and the AFC circuit 21 has proven to be capable of stabilizing the operation of this system on any frequency within this band which may be determined by unknown parameters of a loop and lead-in installation.

Changes may be made in the form, construction, and arrangement of the parts without departing from the spirit of the invention or sacrificing any of its advantages, and the right is hereby reserved to make all such changes as fall fairly within the scope of the following claims.

The invention is claimed as follows:

1. A vehicle presence detector system comprising an astable multivibrator for generating an oscillatory signal having a frequency controlled by a direct signal level, a tuned circuit coupled to the multivibrator to receive the oscillatory signal therefrom, said tuned circuit including means for coupling an inductive loop thereto, said tuned circuit being operable to provide an oscillatory voltage having an amplitude that varies when a vehicle moves into spaced relation with the loop, rectifier means coupled to the tuned circuit for generating a direct signal level corresponding to the amplitude of the oscillatory voltage, and feedback means for passing the direct signal level to the multivibrator for controlling the frequency of the oscillatory signal.

2. A vehicle presence detector system in accordance with claim 1, comprising a start-sweep circuit coupled to the multivibrator for pre-empting control of the multivibrator during an initial transient period, said start-sweep circuit including a biasing means for initially passing a predetermined control voltage to the multivibrator and a long time constant means for disabling the biasing means after the initial transient period to permit the direct signal level from the rectifier means to control the multivibrator.

3. A vehicle presence detector system in accordance with claim 1, comprising a start-sweep circuit circuit coupled to the multivibrator for pre-empting control of the multivibrator during an initial transient period, said start-sweep circuit including a transistor and a capacitor coupled between the transistor and a voltage source, said capacitor and said voltage source being operable to bias the transistor into conduction during the initial transient period, said transistor being coupled to control the multivibrator, said capacitor being operable to accumulate charge and to thereby vary the bias applied to the transistor whereby the transistor becomes biased into nonconduction after the initial transient period and relinquishes the multivibrator control.

4. A vehicle presence detector system in accordance with claim 3, wherein the start-sweep circuit includes a diode coupled between the capacitor and a point of ground reference potential, said diode being nonconductive during times when power is applied to the system, said diode being operable to conduct and to discharge the capacitor during times when no power is applied to the system.

5. A vehicle presence detector system in accordance with claim 1, comprising a constant-current source coupled between the astable multivibrator and the tuned circuit, said constant-current source being biased into conduction during alternate half-cycles of the oscillatory signals, whereby alternate half-cycle waves of constant current are passed to the tuned circuit, including the inductive loop.

6. In a vehicle presence detector system, a voltage-controlled multivibrator circuit, a first transistor and a second transistor, a first and a second capacitor cross-coupled between the transistors, a third transistor, and a fourth transistor, said third transistor being coupled as a controllable current device for passing current to discharge the first capacitor, said fourth transistor being coupled as a controllable current device for passing current to discharge the second capacitor, means for passing a control voltage to both the third and the fourth transistors for controlling the discharge rates of both capacitors, a third capacitor, a first diode, and a second diode, said first diode being coupled between the first transistor and the third capacitor for rectifying alternate half-waves from the first transistor, said second diode being coupled between the second transistor and the third capacitor for rectifying alternate half-waves from the second transistor, whereby the third capacitor receives a charge to generate a biasing potential, said third and said fourth transistors being coupled to receive emitter bias from the third capacitor.

7. In a vehicle presence detector system, a voltage-controlled multivibrator circuit in accordance with claim 6, comprising a fifth transistor coupled as a direct-current amplifier between the third capacitor and both the first and the second diodes, said fifth transistor being operable to charge the third capacitor and to thereby generate the biasing potential without unduly loading the first and second diodes and degrading the operation of the first and second transistors.

8. In a vehicle presence detector system, a voltage-controlled multivibrator circuit in accordance with claim 7, comprising a jumper connection arrangement for directly connecting the third capacitor to both the first and the second diodes, whereby the fifth transistor is rendered nonconductive and inoperable for operation with an alternative power supply.

9. A vehicle presence detector system comprising an astable multivibrator for generating an oscillatory signal having a frequency controlled by a direct-voltage level, a constant-current source coupled to the multivibrator to receive the oscillatory signal therefrom, a tuned circuit coupled to the constant-current source, said tuned circuit including a capacitor and a means for coupling an inductive loop thereto, said constant-current source being operable to pass a constant current into the tuned circuit during alternate half-cycles of the oscillatory wave, a rectifying means coupled to the tuned circuit for generating a first direct-voltage level corresponding to the amplitude of oscillatory signal appearing across the tuned circuit, a differential amplifying means for comparing the first direct-voltage with a standard-voltage level to thereby generate a second direct-voltage level corresponding to the amplitude of the oscillatory signal appearing across the tuned circuit, an automatic frequency control circuit including a storage capacitor and a diode coupled between the storage capacitor and the differential amplifying means for passing variations of one polarity from the second direct-voltage level to charge the storage capacitor, said automatic frequency control circuit further including a Darlington amplifying means for passing an automatic frequency control voltage from the storage capacitor to the astable multivibrator, a start-sweep circuit means coupled to the astable multivibrator for pre-empting control of the multivibrator during transient intervals when power is initially applied to the system, said multivibrator including a first and a second transistor together with a first and a second discharge capacitor, said first and second transistor being cross-coupled by the first and second discharge capacitors, said multivibrator further including a third and a fourth transistor coupled as controllable current sources, said third and fourth transistors being coupled respectively to the first and second discharge capacitor for providing controlled discharging currents thereto, said third and fourth transistors of the multivibrator being directly connected to the Darlington amplifying means and to the start-sweep circuit means for receiving a control voltage to control the discharging currents to the first and second discharge capacitors to thereby control the frequency of the oscillatory signal.

References Cited

UNITED STATES PATENTS

| | | | |
|---|---|---|---|
| 2,531,301 | 11/1950 | Scholten | 331—144 |
| 2,848,610 | 8/1958 | Freienmuth et al. | 331—144 |
| 3,176,245 | 3/1965 | Adams et al. | 331—144 |

FOREIGN PATENTS 985,201  3/1965  Great Britain.

JOHN KOMINSKI, *Primary Examiner.*